J. W. INNIS.
Potato-Diggers.
No. 135,558.
Patented Feb. 4, 1873.
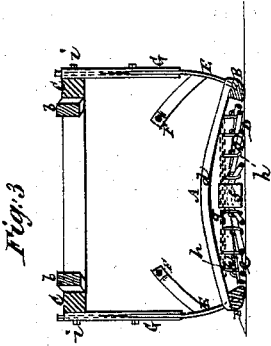
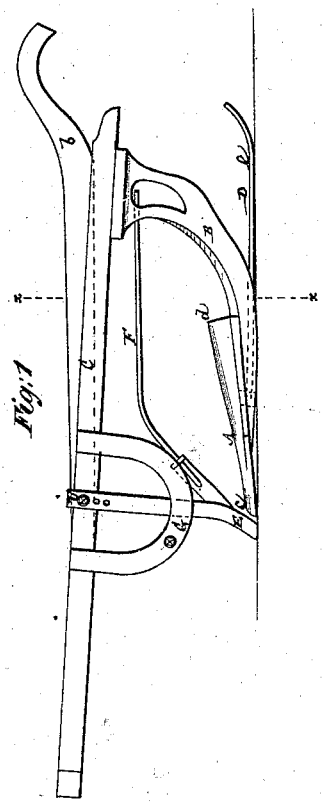
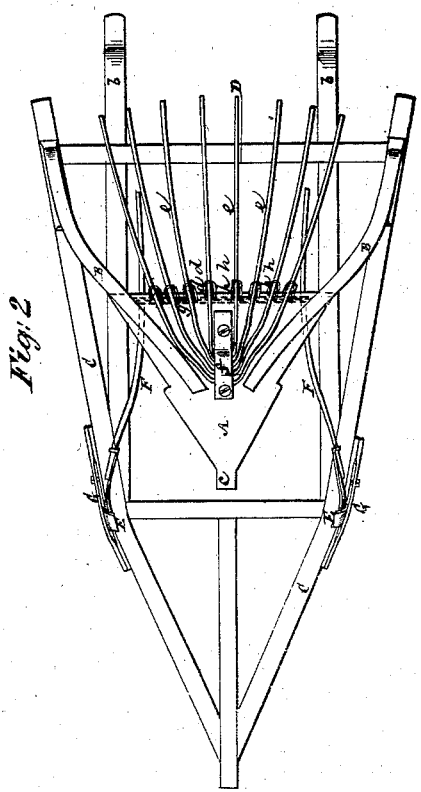

UNITED STATES PATENT OFFICE.

JAMES WYGANT INNIS, OF NEWBURG, NEW YORK.

IMPROVEMENT IN POTATO-DIGGERS.

Specification forming part of Letters Patent No. 135,558, dated February 4, 1873.

*To all whom it may concern:*

Be it known that I, JAMES WYGANT INNIS, of Newburg, in the county of Orange and State of New York, have invented new and useful Improvements in Machines for Digging Potatoes; and I do hereby declare that the following is a full, clear, and exact description of the same, reference being had to the accompanying drawing forming part of this specification.

This invention relates to machines for digging potatoes, which are guided, when in operation, by means of rear handles in substantially the same manner as an ordinary plow or cultivator, the horse or other draft animal being attached in any suitable manner to the forward end of the frame of the machine, and which machine not only digs the potatoes from the soil, but effectually rakes them and deposits them upon the surface of the ground. To these ends my improved potato-digger is provided with a shovel-plow, which is constructed to dip into the earth, to lift the soil, and to spread it sidewise, delivering the potatoes over a back abrupt edge (which serves to detach adhering earth) onto a separator or inverted rake composed of independently-flexible hinged tines, the front portions of which rest on the ground, and for a limited distance backward receive the potatoes, together with a certain amount of earth, while the upwardly-curved backs of the tines rake the earth deposited in rear of the plow, and the potatoes are run over the tines and spread on the ground. The invention also consists in a cross-chain and links for supporting the independently-flexible hinged tines of the inverted rake, whereby provision is made for the yielding of the rake when running over stones, and the rake is retained in position during the raising or lowering and working of the machine by its handles. The vibration of the tines in their rear, where they are unsupported and free of the ground, assists in clearing the earth from the potatoes, and prevents choking of the tines.

Figure 1 represents a side elevation of a potato-digging machine constructed in accordance with my invention; Fig. 2, an inverted plan of the same; and Fig. 3, a transverse section on the line $x\ x$ of Fig. 1.

Similar letters of reference indicate corresponding parts.

A represents a shovel-plow, attached at its rear, by main braces B B, to the main frame C of the machine, which is provided with rear side handles $b\ b$ to guide it, the horse or other draft animal being attached in any suitable manner to the front of the main frame. This plow A, which terminates in a point, $c$, is of tapering form in direction of its length, and of a reversely-shelving shape laterally, leaving its rear end $d$ of a convex form. Thus constructed the plow dips into the earth as it is run lengthwise through or beneath a row of potato-hills, lifts the soil, and spreads it sidewise, passing the potatoes up along the exposed back portion of it, and over its abrupt rear edge $d$ onto a separator or inverted rake, D, their fall over the rear edge $d$ operating to detach adhering earth. The separator or inverted rake D is composed of independently-flexible hinged tines $e\ e$, extending in a flaring manner in rear of the plow, the same being hinged by passing at their looped ends freely through a holder, $f$, of any suitable shape, attached to the under side of the plow. The front portions of these tines rest on the ground, and for a limited distance backward receive the potatoes, together with more or less earth; and the earth thus deposited through the tines is afterward raked by the curved or upturned back ends of the tines, while the potatoes which do not pass through the tines are piled or run up over the latter, and spread on the ground ready to be gathered. The rake D is retained in position during the raising or lowering and working of the machine by its handles when digging, and is supported, as also freedom given it to yield when striking a stone, by a cross-chain, $g$, and pendent links $h$. As it is only the forward portions of the tines that, in practice, trail on the ground, a vibratory motion is secured for their after portions, which assists in clearing the earth from the potatoes and also from the tines. E E are teeth arranged to extend downward from both sides of the frame on opposite sides of the point of the plow, or preferably a little in advance of it. These teeth are pivoted, at $i$, to the side pieces of the frame C, and are adjustable up or down, to vary their depth, by holes in them provided for the purpose. Said teeth, which work on both sides of the potato-row being dug, to catch under the vines or potato-stalks and conduct them to attached trails F F, are held in position by passing through spring or friction clamps G G, which may be slackened or tightened by screw-bolts or otherwise, and which admit of the teeth E E yielding or slipping backward when striking a stone. The trails F F extend in rear of the teeth E E and over the plow A, and serve to keep the potato vines, stalks, or tops from clogging the main braces B B that hold the plow. These main braces are made to curve outwardly in a backward direction, thereby affording a ready clearance for such stalks, sods, or any lumps that may be passed up to them, and effectually preventing choking.

What I claim, and desire to secure by Letters Patent, is—

1. The combination, with the shovel-plow A, of the separator or inverted rake D, composed of independently-flexible hinged tines, constructed and arranged for operation substantially as specified.

2. The combination of the transversely-arranged chain $g$ and its attached links $h$ with the independently-flexible hinged tines $e$ of the inverted rake D, essentially as described.

J. W. INNIS.

Witnesses:
 MICHAEL RYAN,
 DAVID MISELL.